(12) United States Patent
Altinok et al.

(10) Patent No.: US 12,478,975 B2
(45) Date of Patent: Nov. 25, 2025

(54) POWDER PRODUCTION SYSTEM

(71) Applicant: TUSAS-TURK HAVACILIK VE UZAY SANAYII ANONIM SIRKETI, Ankara (TR)

(72) Inventors: Sertac Altinok, Ankara (TR); Ahmet Alptug Tanrikulu, Ankara (TR); Hakan Yavas, Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 327 days.

(21) Appl. No.: 18/269,031

(22) PCT Filed: May 24, 2021

(86) PCT No.: PCT/TR2021/050477
§ 371 (c)(1),
(2) Date: Jun. 22, 2023

(87) PCT Pub. No.: WO2022/146282
PCT Pub. Date: Jul. 7, 2022

(65) Prior Publication Data
US 2024/0042455 A1    Feb. 8, 2024

(30) Foreign Application Priority Data
Dec. 29, 2020    (TR) ................. 2020/22267

(51) Int. Cl.
*B02C 17/18*    (2006.01)
*B02C 17/02*    (2006.01)
(Continued)

(52) U.S. Cl.
CPC .......... *B02C 17/1875* (2013.01); *B02C 17/02* (2013.01); *B02C 17/1815* (2013.01);
(Continued)

(58) Field of Classification Search
CPC . B02C 17/02; B02C 17/1815; B02C 17/1875; B22F 2009/043; B22F 2201/013
See application file for complete search history.

(56) References Cited

U.S. PATENT DOCUMENTS

| | | | | |
|---|---|---|---|---|
| 1,862,575 A | * | 6/1932 | Leaper ................... | C09B 49/00 564/305 |
| 2,480,085 A | * | 8/1949 | Mitchell ................. | B02C 17/02 241/176 |

(Continued)

FOREIGN PATENT DOCUMENTS

| | | | | |
|---|---|---|---|---|
| CN | 104923351 A | * | 9/2015 | ............. B02C 21/02 |
| CN | 109092454 A | * | 12/2018 | ......... B02C 17/1875 |

(Continued)

OTHER PUBLICATIONS

International Search Report and Written Opinion for PCT application No. PCT/TR2021/050477, mailed Jun. 13, 2021.

(Continued)

*Primary Examiner* — Jared O Brown
(74) *Attorney, Agent, or Firm* — Notaro, Michalos & Zaccaria P.C.

(57) ABSTRACT

The invention relates to A powder production system comprising a body (2), at least one mill (3) located on the body (2) so as to rotate about its axis, more than one ball (b) being located in the mill (3), the balls (b) acting on a material to be ground (m) therein by exerting frictional and impact forces on the material to be ground (m) so that the material to be ground (m) is brought to a powder form, and at least one gas supply unit (7) located on the body (2), therebyenabling gas (g) to flow into the body (2).

12 Claims, 2 Drawing Sheets

(51) Int. Cl.
   *B22F 9/00*      (2006.01)
   *B22F 9/04*      (2006.01)
   *B33Y 40/10*     (2020.01)

(52) U.S. Cl.
   CPC ................ *B22F 9/00* (2013.01); *B22F 9/04* (2013.01); *B22F 2009/001* (2013.01); *B22F 2009/043* (2013.01); *B22F 2201/013* (2013.01); *B33Y 40/10* (2020.01)

(56) References Cited

U.S. PATENT DOCUMENTS

| | | | |
|---|---|---|---|
| 5,680,996 | A | 10/1997 | Sadler, III |
| 10,639,712 | B2 | 5/2020 | Barnes et al. |
| 2019/0217389 | A1 | 7/2019 | Parrish et al. |
| 2022/0040762 | A1* | 2/2022 | Kang .................... C22C 1/0458 |

FOREIGN PATENT DOCUMENTS

| | | | | |
|---|---|---|---|---|
| CN | 111992326 | A * | 11/2020 | ............. B02C 17/02 |
| CN | 112108236 | A * | 12/2020 | ............. B02C 17/18 |
| EP | 2567753 | A1 | 3/2013 | |
| KR | 101014350 | B1 * | 2/2011 | ............... B22F 9/20 |
| KR | 20140040477 | A | 4/2014 | |
| KR | 101421244 | B1 * | 7/2014 | ............... B22F 9/04 |
| KR | 20170051698 | A | 5/2017 | |
| KR | 102021939 | B1 | 9/2019 | |
| WO | WO-2010131459 | A1 * | 11/2010 | ............. B22F 1/102 |

OTHER PUBLICATIONS

International Preliminary Report on Patentability, completed Nov. 29, 2022.
Demand/Request for Preliminary Examination dated Oct. 25, 2022.
International Application Status Report generated May 26, 2023.

* cited by examiner

POWDER PRODUCTION SYSTEM

FIELD

This invention relates to a powder production system for obtaining powder metal by recycling scrap and large metal parts.

BACKGROUND

With the development of technology, the use of light, durable and highly specific parts is becoming widespread, especially in sectors such as aviation. These parts are mostly manufactured from aluminum, titanium or alloys thereof. Titanium-based alloys are materials that have a high specific strength, high fracture toughness, excellent corrosion resistance and can maintain their properties at relatively high temperatures. For this reason, this material is frequently used in the main structural framework of aviation platforms and in regions of the jet engine with moderate temperature. In the process of producing the titanium-based alloy material, extraction from ore, pure titanium formation and subsequent alloying (e.g. Ti6Al4V) processes are challenging and costly. While making aircraft parts from raw materials such as billets etc. of titanium-based alloys with subtractive manufacturing technologies, the vast majority of raw materials become scrap in the form of turnings. Titanium-based turnings which become scrap are purchased and recycled by titanium-producing countries at very cheap prices per kilogram. The powdering process of material forms that can be embrittled with hydrogen, especially of titanium-based alloys (e.g. scrap, turnings, large sized powder, etc.), is generally performed using impact based crushing methods (jaw crusher, ball grinding, etc.). However, since such engineering materials are usually ductile, they require very long grinding times and most of the chips cannot be turned into a powder form with a desired size following the process. For this reason, the titanium, which is the basic element of the titanium alloy, is embrittled before crushing. For this purpose, titanium is turned into titanium hydride by subjecting the alloy to hydrogen impregnation. Since titanium hydride is a very fragile material, a grinding process is applied after this phase and the grinding time is substantially reduced by obtaining all the turnings in powder form. After obtaining the powder form, a metal powder is obtained by removing hydrogen from the structure by taking it to a vacuum environment.

The South Korean patent document KR102021939B1, which is included in the known state of the art, discloses a method used for obtaining a high purity titanium alloy powder, in which scrap titanium are turned into powder form by a process completed in three to five steps for HDH (hydriding-dehydriding) and grinding operations. Scraps are hydrogenated in a vacuum oven and then ground in a ball mill to obtain finer powders. Then, the powders are taken from the ball mill and subjected to dehydrogenation under vacuum. Thereafter, a screening process is carried out separately and a spheroidization process is initiated. In said invention, hydriding, dehydriding, grinding and sieving operations are mentioned to take place in succession and in different environments.

In the United States patent application document US20190217389A1, which is included in the known state of the art, a method is described for obtaining fine powders by processing successively added hydrided metal powders of different sizes in a ball mill. In said document, the powder taken from the ball mill are separated from agglomerates by passing it through a sieve that is separate from the mill.

In the South Korean patent document KR101421244B1, which is included in the known state of the art, a method is described for obtaining a spherical powder from a metallic alloy scrap. Titanium scraps are hydrogenated by being passed through a tube furnace. Hydrided scraps are transferred to a grinder for pulverization. In said document, preheated and hydrated scraps are sent to a ball mill.

In the United States patent document U.S. Ser. No. 10/639,712B2, which is included in the known state of the art, a method is described for recycling titanium scraps to obtain spherical powder. In said method, scraps that are placed in a furnace to reach the hydrogenation temperature are exposed to hydrogen so as to give titanium hydride. Then, they are taken into a ball mill and ground. Hydride powders, which are separated from the granules by undergoing a screening processes, are taken into a separate reservoir and dehydrogenated by means of plasma. In said document, dehydrogenation is carried out in a section that is different from the mill.

SUMMARY

With a powder production system developed by this invention, metal alloys such as scrap or surplus titanium and aluminum are recycled and reused in part production. A low-cost and efficient production system is achieved for recycling scrap and obtaining alloy powder.

A further object of the invention is to reduce the production costs of powder to be used in additive manufacturing by obtaining powder from scrap titanium and aluminum alloys.

A further object of the invention is to prevent the formation of waste gas by enabling the circulation of gases used in powder production.

A further object of the invention is to increase the time efficiency and to augment the production volume per unit time by simultaneously performing two and/or three different operations that need to be carried out separately.

The powder production system realized to achieve the object of the invention, as defined in the first claim and in the claims dependent on this claim, comprises a body, at least one mill located on the body and capable of rotating about its axis, accommodating more than one ball and used for grinding and pulverizing materials therein under the impact and friction of said balls.

The powder production system of the invention comprises more than one pore on a lateral wall of the mill, enabling powder and gas in the mill to pass out of the mill; a reservoir located on the body so as to entirely surround the mill and to be concentric and coaxial with the mill, thereby enabling the collection of powder that passes through the pores; at least one heater located inside and/or on the outside of the reservoir, used to heat the mill and/or the reservoir; and at least one gas supply unit located on the body, thereby enabling gas circulation into the body.

In an embodiment of the invention, the powder production system comprises a control unit that controls the parameters of the heater, the mill and/or the gas supply unit.

In an embodiment of the invention, the powder production system comprises a cover mechanism, which is movably located on the mill so as to contact the mill, at least partially covers the pores to enable the determination of the powder sieving size of the pores, and of which the movements are controlled by the control unit.

In an embodiment of the invention, the powder production system comprises more than one mill, being located on the body in a concentric and nested style and each having pores of a different size.

In an embodiment of the invention, the powder production system comprises the mill that provides the grinding of a material to be ground, said material assuming a brittle state as a result of entering into reaction with pure hydrogen and/or with hydrogen diluted with inert gas (e.g. argon, helium, nitrogen), which the gas supply unit transfers from the reservoir into the mill.

In an embodiment of the invention, the powder production system comprises a gas supply unit that allows a material to be ground to assume a brittle state by undergoing hydrogenation with the gas transferred by the gas supply unit into the reservoir, and once the grinding process is completed, enables the gas to be vacuum-extracted from the ground material (dehydriding).

In an embodiment of the invention, the powder production system comprises a mill and a reservoir that have a cylindrical shape.

In an embodiment of the invention, the powder production system comprises a mill that grinds materials consisting of titanium and titanium alloys in the form of turings, scrap, granules and/or large sized powders, which emerge during production in part manufacturing methods via conventional subtractive and/or additive manufacturing.

In an embodiment of the invention, the powder production system comprises a mill that enables to obtain a pre-spheroidization powder which is suitable for use in part production by additive manufacturing.

In an embodiment of the invention, the powder production system comprises a heater in the form of at least one resistance that surrounds the mill concentrically, thereby enabling the heating of the mill and/or the reservoir.

In an embodiment of the invention, the powder production system comprises a heater in the form of at least one cartridge, which passes through the interior of the mill concentrically with the mill, thereby enabling the heating of the mill and/or the reservoir.

In an embodiment of the invention, the powder production system comprises at least one furnace, which is located in the outer region of the reservoir and surrounds the reservoir, and heats the reservoir and/or the mill.

In an embodiment of the invention, the powder production system comprises the steps of heating the reservoir and/or the mill by means of the heater and placing the materials to be ground into the mill; then transferring gas from the gas supply unit to the reservoir; simultaneously with the transferring of gases present the reservoir from the pores into the mill, grinding the materials to be ground that become brittle by entering into a chemical reaction with the gas after the mill starts to rotate about its axis simultaneously with the balls starting to move in the mill; sieving through the pores the ground materials pulverized as a result of grinding and transferring the materials into the reservoir; and collecting the powder in the reservoir by vacuuming the gas from the powder by means of the gas supply unit.

BRIEF DESCRIPTION OF THE DRAWINGS

The powder production system realized to achieve the object of the present invention is shown in the attached figures, wherein from these figures.

DETAILED DESCRIPTION

Figure 1:
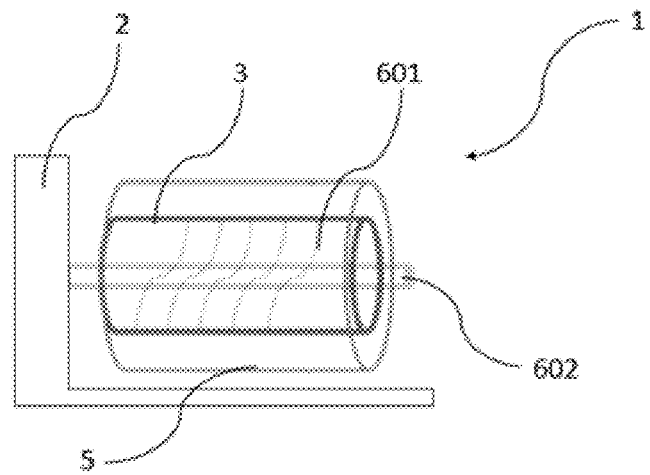
FIG. 1 is a perspective view of the reservoir, mill, resistance, and cartridge.

The parts illustrated in figures are individually assigned a reference numeral and the corresponding terms of these numbers are listed below.
1. Powder production system
2. Body
3. Mill
4. Pore
5. Reservoir
6. Heater
7. Gas supply unit
8. Control unit
9. Cover mechanism
601. Resistance
602. Cartridge
603. Furnace
(g) Gas
(m) Material to be ground
(b) Ball The powder production system (1) comprises a body (2) and at least one mill (3) located on the body (2) so as to rotate about its axis, more than one ball (b) being located in said mill, said balls (b) acting on a material to be ground (b) therein by exerting frictional and impact forces on the material (FIG. 1).

Figure 2:
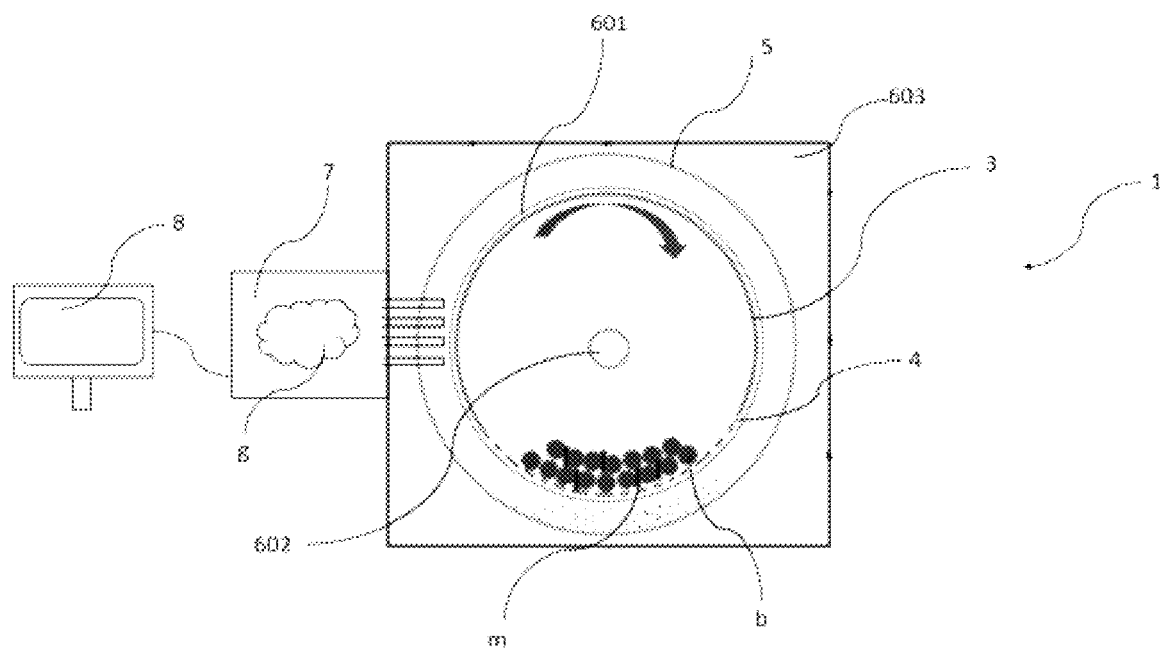
FIG. 2 is a schematic view of the powder production system.

The powder production system (1) of the invention comprises more than one pore (4) on the lateral wall of the mill (3), enabling powder and gas (g) present in the mill (3) to pass out of the mill (3), and a reservoir (5) located on the body (2) so as to entirely surround the mill (3) and to be concentric with the mil (3), thereby enabling the collection of powder that passes through the pores (4), and at least one heater (6) located inside and/or on the outside of the reservoir (5), used to heat the mill (3) and/or reservoir (5), and at least one gas supply unit (7) located on the body (2), thereby enabling gas (g) flow into the body (2) (FIG. 2).

At least one mill (3) is located on the body (2), said mill having a structure that is rotatable about its axis and being capable of grinding and pulverizing the materials to be ground (m) in the mill by means of more than one ball (b) placed therein. The balls (b) in the mill (3) hit the walls of the mill (3) under the effect of centrifugal forces with the rotation of the mill (3), the balls hitting the walls bounce and hit each other and the materials to be ground (m) therein, thereby exerting their frictional and impact forces. In this way, an effective grinding process is carried out.

There is at least one pore (4) located on the lateral walls of the mill (3), enabling the powder and gas (g) contained in the mill (3) to be discharged to the exterior and/or enabling the gas (g) to be introduced into the mill (3). It comprises at least one reservoir (5) located on the body (2), said reservoir (5) entirely surrounding the mill (3), collecting powders sieved out of the mill (3) and having a structure which prevents the powders from escaping out, at least one heater (6) heating the reservoir (5) and/or the mill (3), and at least one gas supply unit (7) supplying gas (g) into the interior of the reservoir (5) and/or the mill (3) or vacuuming the gas (g) therefrom. In this way, powders can be obtained by providing an effective and efficient recycling of scrap materials to be ground (m).

In an embodiment of the invention, the powder production system (1) comprises a control unit (8) controlling the heating amount of the heater (6), the rotation speed of the mill (3) and/or the gas (g) flow amount of the gas supply unit (7) and the powder production parameters. The control unit (8) provides the control of the heating degree of the heater (6), the rotation number and duration of the mill (3), the gas (g) supply and extraction amount and timing of the gas supply unit (7), and other parameters required for powder production. In this way, a continuous, rapid and effective production is ensured.

Figure 3:
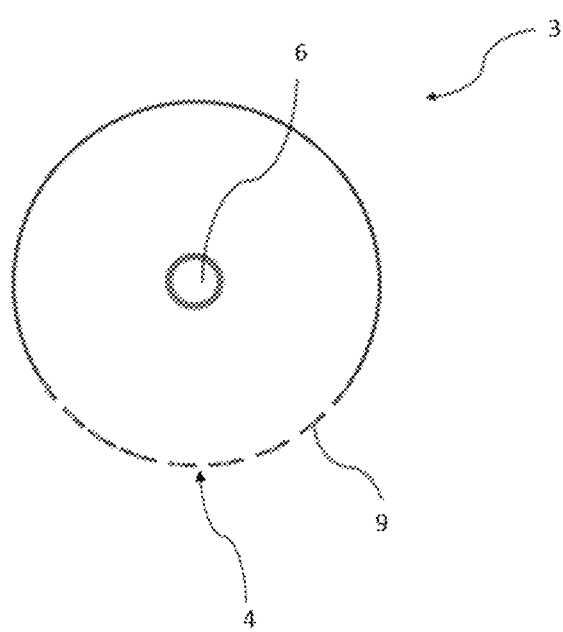
FIG. 3 is a cross-sectional view of the mill.

In an embodiment of the invention, the powder production system (1) comprises a cover mechanism (9), being movably located on the mill (3) so as to contact the mill (3), at least partially covering the pores (4), thereby enabling the size of the powder passing through the pores (4) to be determined, and the movement of which being controlled by the control unit (8). Instead of producing additional mills (3) for powders of different sizes in the mill (3), the pores (4) are opened and closed using more than one cover mechanism (9), which is located on the mill (3) so as to contact the mill (3) and the pores (4), in order to enable the production of powder of many different diameters in a single mill (3). In this way, a more effective production is achieved by obtaining powder in more than one dimension using a single mill (3). (FIG. 3)

In an embodiment of the invention, the powder production system (1) comprises more than one mill (3) located on the body (2) in a concentric and nested style, each mill having pores (4) of a different size. Multiple nested coaxial mills (3) can be used when it is desired to produce powder with gradual and different sizes in the mills (3). In this way, powders of different sizes can be obtained in a fast manner with the same powder production system (1).

In an embodiment of the invention, the powder production system (1) comprises a mill (3) that provides the grinding of a material to be ground (m), said material assuming a brittle state as a result of entering into chemical reaction with the gas (g) composed of pure hydrogen and/or hydrogen diluted with inert gas (e.g. argon, helium, nitrogen), which the gas supply unit (7) transfers from the reservoir (5) to the mill (3). Hydrogen and/or diluted hydrogen gas (g) supplied by the gas supply unit (7) into the reservoir (5) passes into the mill (3) through the pores (4) and reaches the materials to be ground (m). Under the effect of heat, the material to be ground (m) assume a brittle state by entering into chemical reaction with the gas (g). Thus, the material to be ground (m) can effectively be ground. In an embodiment of the invention, the powder production system (1) comprises a gas supply unit (7) that allows a material to be ground (m) to have a brittle structure by undergoing hydriding with the gas (g) filled by the gas supply unit into the reservoir (5), and once the grinding process is completed, enables the gas (g) to be vacuumed from the material to be ground (m) (dehydriding). While the gas (g) fed by the gas supply unit (7) allows the material to be ground (m) to undergo hydriding, the gas (g) from the powder formed after the grinding process is vacuumed back by the gas supply unit (7) and the material is dehydrided. Thus, it is ensured that the powder reaches its first composition in order to be used in additive manufacturing after grinding.

In an embodiment of the invention, the powder production system (1) comprises a mill (3) and a reservoir (5) with a cylindrical form. The mill (3) in the cylindrical form effectively rotates about its axis and performs the grinding process and allows the balls (b) to move more effectively. It is easier to gather and collect the powder within a cylindrical reservoir (5). Thanks to this, a more effective powder production is provided.

In an embodiment of the invention, the powder production system (1) comprises a mill (3) that provides the material to be ground (m) consisting of titanium and titanium alloys in the form of turnings, scrap, granules and/or large powders, obtained from part forming methods using conventional subtractive and/or additive manufacturing processes. It is hereby enabled to grind waste scrap, turnings or large sized powdered materials to be ground (m) in the mill (3). Thus, the material to be ground (m) is ensured.

In an embodiment of the invention, the powder production system (1) comprises a mill (3) that enables to obtain pre-spheroidization powders which are suitable for use in additive manufacturing. No spheroidization process is carried out on the powders obtained from the mill (3). Powders that undergo the necessary spheroidization process (e.g. thermal plasma spray, High Velocity Oxygen Fuel (HVOF) coating) are then used in the production of parts in additive manufacturing. Thus, a lower cost product manufacturing is ensured.

In an embodiment of the invention, the powder production system (1) comprises a heater (6) in the form of at least one resistance (601), which surrounds the mill (3) concentrically, and enables to heat the mill (3) and/or the reservoir (5). Thanks to the resistance (601), which entirely surrounds the mill (3) and serves to heat it with electrical energy, the mill (3) is heated. Heating is required for the hydriding process. Thus, it is enabled to effectively heat the materials to be ground (m).

In an embodiment of the invention, the powder production system (1) comprises a heater (6) in the form of at least one cartridge (602), which is passed concentrically through the mill (3) and enables to heat the mill (3) and/or the reservoir (5). Thanks to the cartridge (602), which passes through the interior of the mill (3) in a coaxial way and serves to heat it with electrical energy, it is enabled to heat the mill (3). Heating is required for the hydriding process. Thus, it is enabled to effectively heat the materials to be ground (m).

In an embodiment of the invention, the powder production system (1) comprises at least one heater (6) in the form of a furnace (603) located outside of the reservoir (5) and surrounding the reservoir (5), enabling to heat the reservoir (5) and/or the mill (3). An equal heating of the mill (3) and reservoir (5) is provided by the furnace (603) surrounding the reservoir (5). Thus, it is enabled to effectively heat the materials to be ground (m).

In an embodiment of the invention, the powder production system (1) comprises the steps of heating the reservoir (5) and/or the mill (3) by means of the heater (6) and placing the materials to be ground (m) into the mill (3), transferring the gases (g) from the gas supply unit (7) to the reservoir (5), and simultaneously with the supply of gases (g) present in the reservoir (5) to the mill (3) through the pores (4), rotating the mill (3) about its axis, grinding the materials (m) which assume a brittle form by entering into chemical reaction with the gas (g) under the moving action of the balls (b) in the mill (3), sieving through the pores (4) the material to be ground (m) to a powder form and transferring to the reservoir (5), collecting the powder in the reservoir (5) by vacuuming the gas (g) from the powder by means of the gas supply unit (7). The materials to be ground (m) placed in the mill (3) become brittle with the gases (g) charged by the gas supply unit (7). When the mill (3) is rotated, the material to be ground (m) which are already brought to a brittle form are ground with the movement of the balls (b) exerting impact and frictional forces. Powders that become small so as to be able to pass through the diameter of the pores (4) pass through the pores (4) into the reservoir (5). These phases take place simultaneously. Then, the collected hydride powders are separated from the gas (g) with a vacuum applied by the gas supply unit (7) and the desired composition of the powders is obtained. Thus, a fast, effective and efficient powder production is ensured.

The invention claimed is:

1. A powder production system (1) comprising:
a body (2);
at least one mill (3) located on the body (2) so as to rotate about an axis of the mill; more than one ball (b) being located in said mill (3), said balls (b) acting on a material to be ground (m) therein by exerting frictional and impact forces;
more than one pore (4) on the lateral wall of the mill (3), enabling powder and gas (g) present in the mill (3) to pass out of the mill (3);
a reservoir (5) located on the body (2) so as to entirely surround the mill (3) and to be concentric with the mill (3), thereby enabling the collection of powder that passes through the pores (4);
at least one heater (6) located inside and/or outside of the reservoir (5), enabled to heat the mill (3) and/or the reservoir (5);
at least one gas supply unit (7) located on the body (2), thereby enabling gas (g) comprising pure hydrogen and/or hydrogen diluted with inert gas to flow through the body (2) into the reservoir (5); and
wherein the mill (3) provides grinding of said material to be ground (m), said material to be ground (m) assuming a brittle structure as a result of entering into chemical reaction with the gas (g), and wherein the gas supply unit (7) causes the gas to transfer from the reservoir (5) to the mill (3).

2. The powder production system (1) as claimed in claim 1, comprising a control unit (8) controlling powder production parameters including an amount of heating provided by the heater (6), a rotation speed of the mill (3) and/or an amount of gas flow provided by the gas supply unit (7).

3. The powder production system (1) as claimed in claim 2, comprising a cover mechanism (9) located movably on the mill (3) so as to contact the mill (3), at least partially covering the pores (4), thereby enabling a size of the powder passing through the pores (4) to be determined, a movement of the cover mechanism being controlled by the control unit (8).

4. The powder production system (1) as claimed in claim 1, wherein the at least one mill (3) comprises more than one mill arranged on the body concentrically and nested relative to each other, and wherein the more than one pore of each mill has different sizes.

5. The powder production system (1) as claimed in claim 1, wherein the gas supply unit (7) allows said material to be ground (m) to have a brittle structure by undergoing hydriding with the gas (g) filled by the gas supply unit into the reservoir (5), and enables the gas (g) to be vacuumed from the powder once the grinding process is completed.

6. The powder production system (1) as claimed in claim 1, characterized in that wherein the mill (3) and the reservoir (5) have a cylindrical form.

7. The powder production system (1) as claimed in claim 1, wherein said material to be ground (m) is obtained from part forming methods using subtractive and/or additive manufacturing processes, and wherein the material (m) consists of turnings, scrap, or granules, consisting of titanium and titanium alloys.

8. The powder production system (1) as claimed in claim 1, wherein the powder is a pre-spheroidization powder which is suitable for use in part production by additive manufacturing.

9. The powder production system (1) as claimed in claim 1, wherein the heater (6) is at least one resistance heater (601), which concentrically surrounds the mill (3) and is configured to heat the mill (3) and/or the reservoir (5).

10. The powder production system (1) as claimed in claim 1, wherein the heater (6) is at least one cartridge heater (602), which is passed concentrically through the mill (3) and is configured to heat the mill (3) and/or the reservoir (5).

11. The powder production system (1) as claimed in claim 1, wherein the heater (6) is at least one furnace (603) surrounding the reservoir (5) and configured to heat the reservoir (5) and/or the mill (3).

12. A method of using a powder production system (1) as claimed claim 1, comprising the steps of:
placing the material to be ground (m) into the mill (3),
heating the mill (3) and/or the reservoir (5) using the heater (6),
transferring the gas (g) from the gas supply unit (7) to the reservoir (5), and simultaneously transferring the gas (g) present in the reservoir (5) to the mill (3) through the pores (4),
rotating the mill (3) about the axis,
grinding the material to be ground (m) which assumes a brittle form by entering into chemical reaction with the gas (g) under a moving action of the balls (b) in the mill (3) to produce the powder,
transferring the powder from the mill (3) to the reservoir (5) by sieving the powder through the pores (4), and
collecting the powder in the reservoir (5) by vacuuming the gas (g) from the powder using of the gas supply unit (7).

* * * * *